United States Patent [19]

Geohegan, Jr. et al.

[11] 4,083,433

[45] Apr. 11, 1978

[54] ACTIVE VIBRATION DAMPER WITH ELECTRODYNAMIC SENSOR AND DRIVE UNITS

[75] Inventors: Kenneth P. Geohegan, Jr., Catonsville; Christopher R. Collins, Arnold; George Bawroski, Pasadena; George H. Steiner, Church Creek, all of Md.

[73] Assignee: Westinghouse Electric Corporation, Pittsburgh, Pa.

[21] Appl. No.: 742,473

[22] Filed: Nov. 16, 1976

[51] Int. Cl.$^2$ ............................................. F16D 63/00
[52] U.S. Cl. ....................................... 188/1 B; 310/51
[58] Field of Search ............... 188/1 B, 1 BX, 266; 248/20, 19, 358 R; 74/574; 310/51; 73/67, 70, 71, 71.2; 244/17.27; 335/219

[56] References Cited

U.S. PATENT DOCUMENTS

| 2,361,071 | 10/1944 | Vang | 188/1 B |
| 2,964,272 | 12/1960 | Olson | 188/1 B |
| 3,548,972 | 12/1970 | Flannelly | 188/1 B |
| 3,566,993 | 3/1971 | Leatherwood et al. | 188/1 B |

Primary Examiner—Trygve M. Blix
Assistant Examiner—Douglas C. Butler
Attorney, Agent, or Firm—D. Schron

[57] ABSTRACT

An electrodynamic sensor unit and a drive unit are attached to a member subject to vibration. The sensor unit provides a signal proportional to the vibration velocity, and this signal is utilized to govern the operation of the drive unit, which acts to reduce the vibration amplitude.

3 Claims, 9 Drawing Figures

ACTIVE VIBRATION DAMPER WITH ELECTRODYNAMIC SENSOR AND DRIVE UNITS

GOVERNMENT CONTRACT

The invention herein described was made in the course of or under a contract or subcontract thereunder with the Department of the Navy

BACKGROUND OF THE INVENTION

1. Field of the Invention

This invention in general relates to vibration damping apparatus, and more particularly to such apparatus of the active type.

2. Description of the Prior Art

The vibration behavior of most rigid structures is characterized by several modes of vibrational motion each associated with a particular resonant frequency. Methods utilized to reduce the vibration include the use of a passive damping material such as a viscoelastic compound or other energy absorber in contact with the structure, to introduce damping. Under many circumstances, however, the damping material must cover an appreciable fraction of the surface to be damped and for large structures the material not only significantly increases the total weight due to the heavy damping material, but uses volume which is often limited, and seldom achieves a damping ratio of more than 10%.

To overcome the deficiencies of a passive damping arrangement, use is made of an active vibration isolation system which includes, in general, a sensor which senses the movement of the vibrating body and translates this movement into an electrical signal. This signal is provided to a driver unit which counteracts the vibrational movement. Prior art systems of this type include a piezoelectric sensor, or other type of displacement sensor, interposed between a vibrating body and a base and which produces a signal proportional to the displacement of the body relative to the base. The signal is provided to an active driver connected to the body to counteract the movement and in essence the arrangement simulates a spring isolation.

The present invention utilizes a sensor-driver arrangement, however one wherein a dashpot or shock absorber is simulated, even on a body in free space, so as to absorb the vibrational energy and reduce the velocity of vibration of the body.

SUMMARY OF THE INVENTION

The active vibration damper system of the present invention includes a sensor means for attachment to a body subject to vibration with the sensor means being of the type that provides an output signal proportional to the vibration velocity of the body relative to the surrounding ambient medium as opposed to a signal proportional to the displacement of the body relative to some base member.

An electronic circuit means is provided and is responsive to the signal proportional to the velocity to provide an output control signal. A driver means connected to the body in the vicinity of the sensor is responsive to the control signal for applying a counteracting force to the body which force is proportional to the body vibration velocity.

In one embodiment the driver is of the type which reacts against an inertia block to generate a force on the body related to its velocity in space as opposed to generating a force between the body and a base member.

DESCRIPTION OF THE PREFERRED EMBODIMENT

Figure 1A:
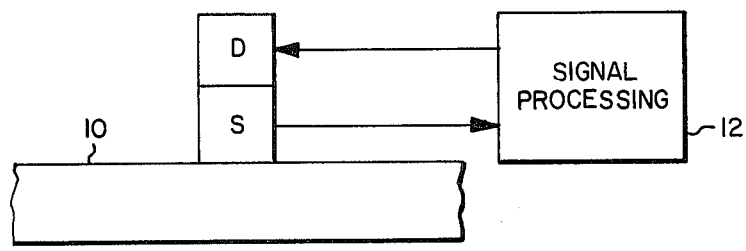
FIGS. 1A, 1B and 1C illustrate three different arrangements of sensor and driver units for reducing the vibration of a body.

Referring now to FIG. 1A there is illustrated a portion of a body 10 subject to vibration. A sensor (S) is affixed to the vibrating body 10 and is of the type which will provide an output signal proportional to the velocity of the vibrating body. Signal processing circuit 12, including amplifying means, is responsive to the sensor signal to provide a drive signal to a driver (D) coaxially arranged with the sensor on the same side of body 10.

Figure 1B:
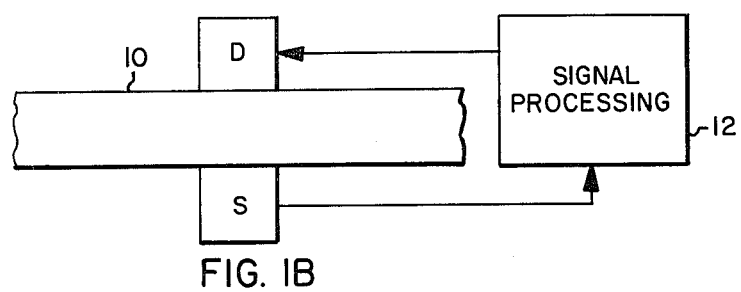
Figure 1C:
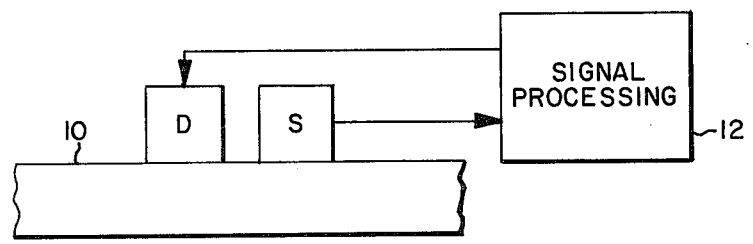

Other positional arrangements are possible such as illustrated in FIG. 1B where the driver and sensor are coaxially arranged on opposite sides of the vibrating body and in FIG. 1C where they are arranged side by side.

In accordance with well-known circuit design procedures, the signal processing network 12 may include a compensation network to prevent circuit oscillation and to maintain proper operation within a certain frequency range.

The sensor is of the type which provides an output signal proportional to velocity so as to create a driving force proportional to velocity, resulting in an extraction of energy from the system.

The analogy may be made as follows. There are three ways to drive a vibrating body to counteract vibration: with a force porportional to the acceleration of the body; with a force proportional to the displacement of the body; and with a force proportional to the velocity of the body. The analogy to the first instance, acceleration, is similar to putting a heavy weight on a vibrating body. It will still oscillate, however, at a different frequency and amplitude. The analogy to the second instance, displacement, is similar to attaching springs to the vibrating body. The vibration is isolated, however, it is not necessarily a damper unit. The analogy to the third instance, velocity, is similar to putting a dashpot or shock absorber on the vibrating body. In such instance energy will continually be extracted and dissipated to damp the vibration.

Figure 2:
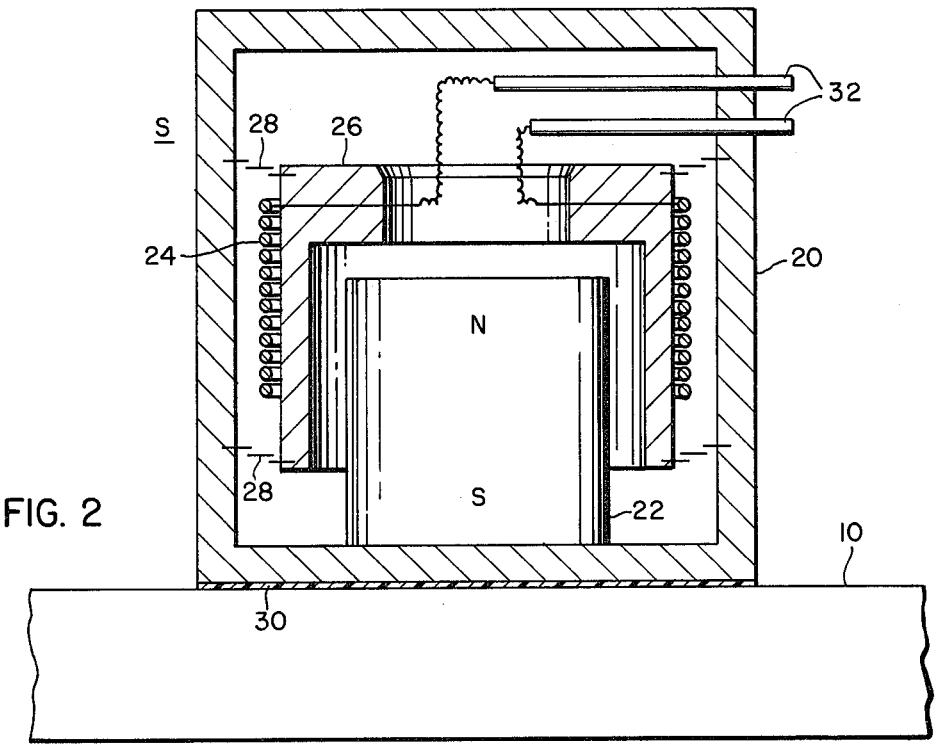
FIG. 2 is a cross-sectional view of a typical sensor or driver unit of the present invention.

A variety of sensors exists for providing the signal proportional to velocity, and one such well-known sensor is illustrated in FIG. 2, to which reference is now made.

The electromagnetic sensor includes a case 20 containing a permanent magnet pole piece 22 and a coil 24 wound upon a coil form 26 which additionally functions as an inertia element.

A spider or suspension spring 28 connects the inertia element 26 with the case 20 and as such, the inertial element tends to remain fixed in space as the magnetic pole piece and case move relative to it by virtue of the case's attachment to the vibrating body, the attachment being made by way of an epoxy glue 30 by way of example. The output of the coil 24 at output terminals 32 by the nature of the electromechanical coupling is such that a voltage is generated which is proportional to the relative velocity of the coil 24 (and inertia element 26) with respect to the magnet 22.

The driver unit D used to produce a force proportional to the velocity measured and thus act like a damping force, may be identical to the sensor unit of FIG. 2. In the application as a driver unit a signal is applied to coil 24 by way of terminals 32, and as the coil and inertial element move, a reaction force is generated in the magnet and case to damp the vibration.

Figure 3:
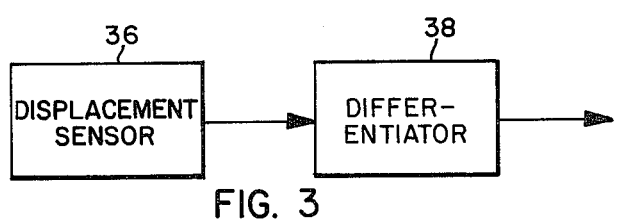
FIGS. 3 and 4 are alternative embodiments of sensor units.

Displacement sensors and accelerometers can be used in the present invention, however with certain modification. For example, FIG. 3 illustrates a displacement sensor 36 which provides an output voltage proportional to displacement. If this output signal is differentiated in differentiator circuit 38, the resulting output is a signal proportional to velocity.

Figure 4:
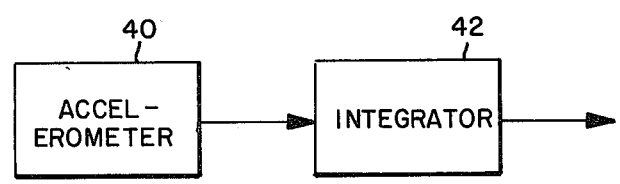

Similarly, in FIG 4, the output of accelerometer 40 is a voltage proportional to acceleration, which, if integrated by means of integrator circuit 42, yields a signal porportional to velocity.

Figure 5:
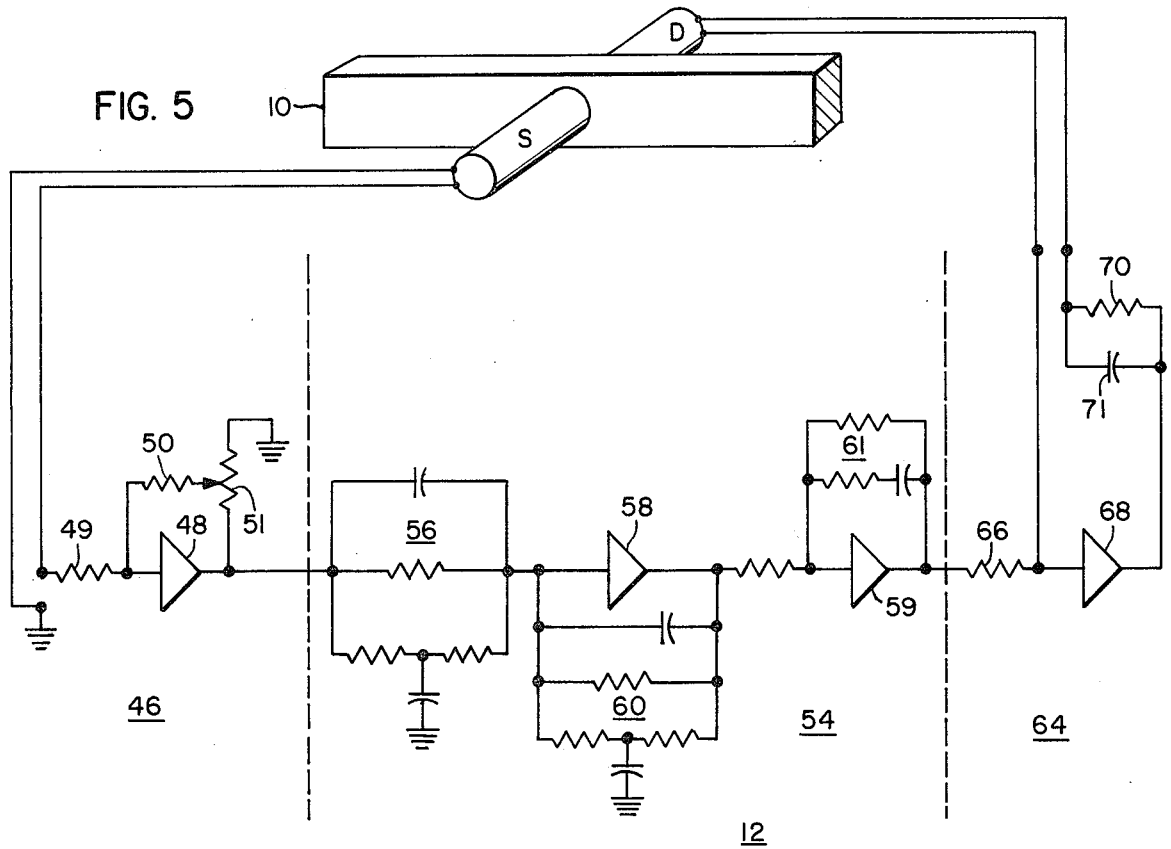
FIG. 5 illustrates one type of signal processing circuit which may be utilized herein.

FIG. 5 illustrates one type of signal processing network which may be utilized in conjunction with a sensor and driver on opposite sides of the vibrating member 10. The signal processing network includes a first stage 46 which is a preamplifier stage including an amplifier 48 having an input resistor 49, with a feedback resistor 50 connected to potentiometer 51 for adjusting the gain. Following, is a compensation network 54 which is commonly inserted in such feedback arrangement so as to prevent loop oscillation and to govern the frequency band of operation. The compensation network 54 includes an input filter section 56 and a plurality of amplifiers 58 and 59 each including respective feedback filter networks 60 and 61. Compensation network 54 feeds a power amplifier stage 64 through input resistor 66 to amplifier 68. The driver is in the feedback loop around amplifier 68 in series with the parallel combination of resistor 70 and capacitor 71.

Figure 6:
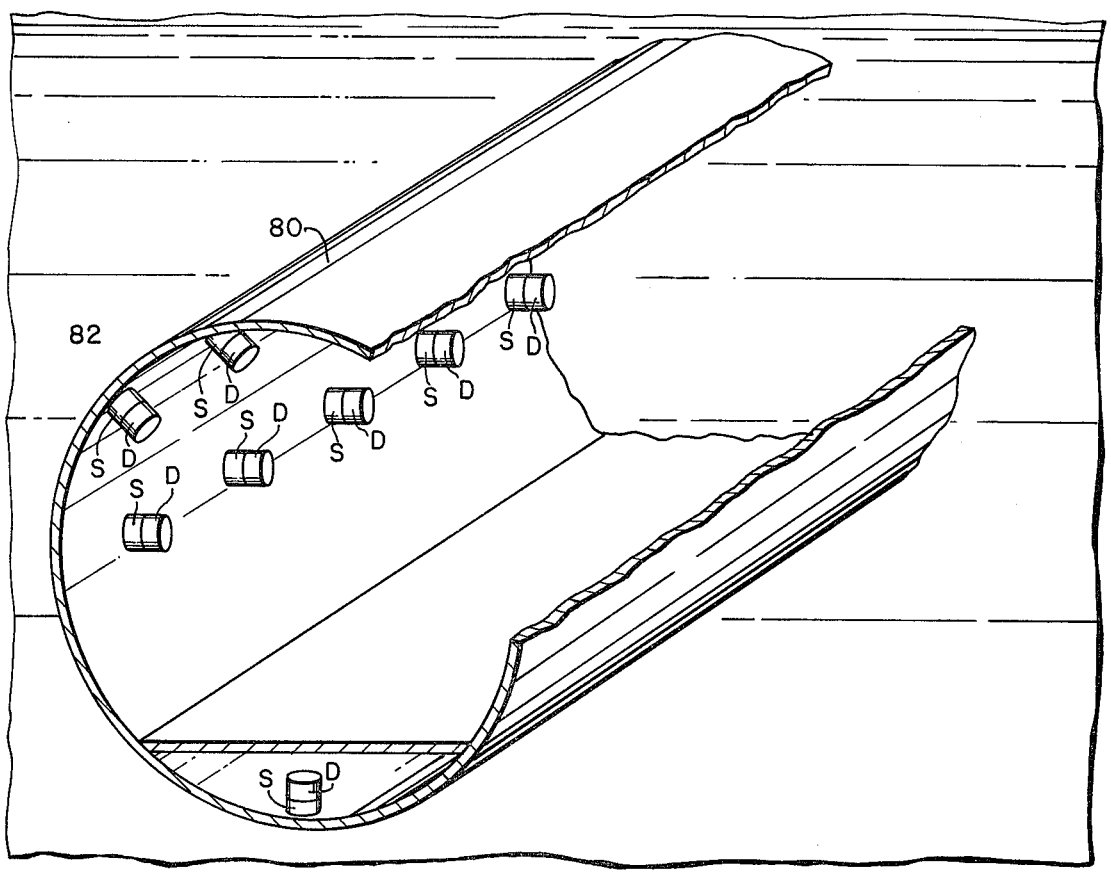
FIG. 6 illustrates the mounting of the units within a submersible vehicle.

FIG. 6 illustrates a partial isometric view, with portions cut away, of an undersea vehicle such as a submarine. Due to various causes such as operating machinery, hull 80 has a tendency to vibrate at a certain resonant frequency, representing an objectionable and unwanted situation. The sensor driver unit combination of the present invention is illustrated as being disposed on the inside surface of said hull and along the length thereof so as to damp the many vibration modes and to reduce radiation of acoustic energy into the surrounding ambient medium 82.

Figure 7:
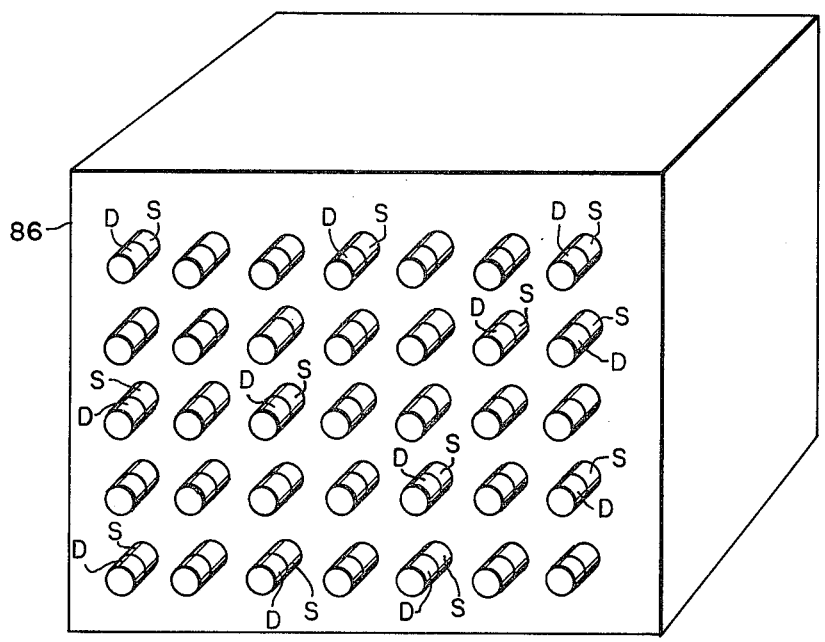
FIG. 7 illustrates the mounting of the units on a vibrating member such as a transformer.

In FIG. 7 structure 86 is representative of a vibrating or noise making structure such as a transformer. The sensor-driver unit combination of the present invention may be disposed on the outer surface of the transformer so as to damp the vibration and attendant noise therefrom with a predetermined frequency band of interest.

We claim:

1. An active vibration damper system for a body subject to vibration, comprising:
   A. sensor means for operative connection with said body and being of the type to provide an output signal proportional to the vibration velocity of said body relative to the surrounding ambient medium;
   B. a signal processing network responsive to said output signal for providing a resultant control signal;
   C. driver means responsive to said control signal for applying to said body a counteracting force proportional to said body velocity;
   D. said sensor means including
      i. a case member;
      ii. a permanent magnet connected to, and contained within said case;
      iii. an inertial element suspended within said case and around said magnet;
      iv. a coil wound about said inertial element; and
      v. terminal means in electrical connection with said coil.

2. An active vibration damper system for a body subject to vibration, comprising:
   A. sensor means for operative connection with said body and being of the type to provide an output signal porportional to the vibration velocity of said body relative to the surrounding ambient medium;
   B. a signal processing network responsive to said output signal for providing a resultant control signal;
   C. driver means responsive to said control signal for applying to said body a counteracting force proportional to said body velocity;
   D. said driver means including
      i. a case member;
      ii. a permanent magnet connected to, and contained within, said case;
      iii. an inertial element suspended within said case and around said magnet;
      iv. a coil wound about said inertial element; and
      v. terminal means in electrical connection with said coil.

3. An active vibration damper system for a body subject to vibration, comprising:
   A. sensor means for operative connection with said body and being of the type to provide an output signal proportional to the vibration velocity of said body relative to the surrounding ambient medium;
   B. a signal processing network responsive to said output signal for providing a resultant control signal;
   C. driver means responsive to said control signal for applying to said body a counteracting force proportional to said body velocity;
   D. said signal processing network including
      i. an input preamplifier section, and
      ii. an output power amplifier section including a feedback loop; and
   E. said driver means being electrically connected in said feedback loop.

* * * * *